(12) United States Patent
Bode et al.

(10) Patent No.: US 6,352,111 B1
(45) Date of Patent: Mar. 5, 2002

(54) FILTER FOR SUBTERRANEAN WELLS

(75) Inventors: Jeffrey Bode, The Woodlands; J. Gary Fontenot, Conroe; Bill Rouse, Montgomery; Joe Jordon, Willis, all of TX (US)

(73) Assignee: Weatherford/Lamb, Inc., Wilmington, DE (US)

( * ) Notice: Subject to any disclaimer, the term of this patent is extended or adjusted under 35 U.S.C. 154(b) by 0 days.

(21) Appl. No.: 09/480,245

(22) Filed: Jan. 11, 2000

(51) Int. Cl.$^7$ .......................... E21B 43/08; E21B 43/38
(52) U.S. Cl. .................... 166/265; 166/66.4; 166/105; 166/227; 166/234; 166/242.2; 166/369; 210/170; 210/315; 210/460; 210/484; 210/490; 210/492
(58) Field of Search .................... 166/66.4, 74, 105, 166/105.1, 227, 234, 242.2, 265, 278, 369, 370; 210/170, 315, 460, 484, 490, 492

(56) References Cited

U.S. PATENT DOCUMENTS

| | | | |
|---|---|---|---|
| 2,858,894 A | | 11/1958 | Akeyson ...................... 166/230 |
| 2,877,852 A | | 3/1959 | Bashara ...................... 166/236 |
| 2,985,241 A | | 5/1961 | Hanslip ....................... 166/230 |
| 3,850,203 A | * | 11/1974 | Shobert ....................... 210/490 |
| 4,241,787 A | * | 12/1980 | Price ...................... 166/265 X |
| 4,609,465 A | * | 9/1986 | Miller ..................... 210/484 X |
| 4,613,369 A | | 9/1986 | Koehler ........................ 75/246 |
| 4,882,056 A | * | 11/1989 | Degen et al. ................ 210/490 |
| 4,917,183 A | * | 4/1990 | Gaidry et al. ................ 166/278 |
| 5,115,864 A | * | 5/1992 | Gaidry et al. ................ 166/278 |
| 5,339,895 A | | 8/1994 | Arterbury et al. ............ 166/227 |
| 5,396,950 A | * | 3/1995 | Talley et al. .......... 166/242.2 X |
| 5,664,628 A | | 9/1997 | Koehler et al. .............. 166/369 |
| 5,673,752 A | | 10/1997 | Scudder et al. .............. 166/265 |
| 5,690,171 A | | 11/1997 | Winch et al. .................. 166/63 |
| 5,881,812 A | * | 3/1999 | Malbrel et al. .............. 166/278 |
| 5,901,789 A | | 5/1999 | Donnelly et al. ............ 166/381 |
| 5,914,039 A | * | 6/1999 | Mahendran et al. ..... 210/490 X |
| 6,006,829 A | | 12/1999 | Whitlock et al. ............ 166/228 |

FOREIGN PATENT DOCUMENTS

| | | |
|---|---|---|
| DE | 3147935 A1 | 6/1983 |
| EP | 0 568 381 A1 | 11/1993 |
| EP | 0 674 095 A2 | 9/1995 |
| GB | 2 314 281 A | 12/1997 |
| GB | 2 336 383 | 10/1999 |
| GB | 2 337 709 | 12/1999 |

OTHER PUBLICATIONS

PCT International Search Report for PCT/GB 01/00031, Mar. 16, 2001, 5 pages.

* cited by examiner

Primary Examiner—George Suchfield
(74) Attorney, Agent, or Firm—Moser, Patterson & Sheridan, L.L.P.

(57) ABSTRACT

A subterranean filter to remove particles from production fluid in a well includes a perforated inner member, at least one filter membrane made of a non-woven polymer material and a metal braided layer installed around the membrane and inner member to provide a filter having improved permeability and resistance to chemical and physical forces.

19 Claims, 4 Drawing Sheets

FILTER FOR SUBTERRANEAN WELLS

BACKGROUND OF THE INVENTION

1. Field of the Invention

The present invention relates to subterranean filters for use in oil, gas, and water wells. More particularly, the invention relates to filters having a non-woven, polymer membrane surrounded by a metal braided layer giving the filter improved permeability, resistance to chemical breakdown, and physical strength.

2. Background of the Related Art

The problem of reliably removing particulates from liquids or gasses (production fluids) exist in many types of wells including oil and gas wells, water wells, geothermal wells, and wells for ground remediation. Typical particulates needing to be filtered out are sand and clay including unconsolidated particulate matter, also known as "formation sand". A major problem in producing hydrocarbon fluids from unconsolidated formations is the intrusion of formation sand, which is typically very fine, into the production fluid and equipment. The presence of sand in the production fluid often leads to the rapid erosion of expensive well machinery and hardware.

Subterranean filters, also known as "sand screens" have been used in the petroleum industry for years to remove particulates from production fluids. They generally comprise a perforated inner member or pipe, a porous filter membrane wrapped around and secured to the outer periphery of the pipe and an outer cover. Filtering in a subterranean well is typically performed at the position in the well where the fluid enters the production string. A common way to achieve the filtration is to mount a tubular filter in the production string near the area of fluid production such that the produced fluid must pass through the filter prior to entering the production string and being pumped to the surface.

FIG. 1 is a sectional view showing the position of a filter in use with a submersible rotary pump. Well 10 comprises well head 11, casing 12, and production string 13. Production string 13 comprises piping 16, submersible pump 17, filter 18, and electric motor 19 for driving the pump. Filter 18 removes particulate matter which may otherwise cause damage to pump 17 and other equipment used in the production and collection process. The filter 18 has threads at each end for attaching the filter to adjacent members of the production string. Pump 17 and motor 19 are also threadedly attached to the production piping. Filter 18 has perforations 21 exposing the interior of the production piping 16 to production fluid in well annulus 22. Casing 12 is perforated 26 exposing annular space 22 to production fluid present in production zone 27. The perforation extends outward into zone 27 as illustrated by fracture 25. Production fluid flows from zone 27 through perforations 26 into annular space 22, through filter perforations 21, through pump 17, into piping 16, and to wellhead 11 for collection.

Various filter designs using various membrane materials are currently used to filter sand from unconsolidated formations. Membrane materials include metal screens, sintered fibers, ceramic materials, woven polymer fabrics and Dutch twill weaves. All of these prior art filters are subject to failure from chemical and physical forces present in a well. For example, oil and gas wells are often treated with enhanced recovery chemicals (stimulation chemicals) which are often highly corrosive. In addition, corrosive acids may also be naturally present in crude oil or gas. Filters having metallic membranes, such as sintered or wire screen membranes, are subject to failure due to corrosion. Filters with ceramic or Dutch twill membranes are also susceptible to chemical damage.

In addition to chemical threats, filters can be damaged or destroyed by the extremely high hydrostatic pressures at which they sometimes operate. These pressures result in high stresses in the radial direction, which may cause the filter to deform or collapse. A deformed filter may effectively close areas of the filter membrane which may cause sediments to accumulate in, and ultimately clog the filter. In filters having ceramic or Dutch twill membranes, the membrane material itself may fail in the radial direction under high pressures.

Another widely used enhanced recovery technique in oil and gas wells that can damage a filter is the use of gravel packing. To prevent the perforations in a well casing wall from filling in with sediment, which will block the flow of fluid, sand is pumped into the well to fill the perforations and the annular space between the filter and the well casing. The well shown in FIG. 1 has been gravel packed. The sand or gravel has a large enough grain size such that the fluid will flow through the sand packing and into the well. The sand must be pumped under very high pressure down the well bore and into the perforated formation. This high-pressure environment may cause the filter near the packed formation to deform or collapse.

Yet another problem encountered by submersible filters are highly deviated wells.

Oil and gas wells are often directionally drilled to increase the length of production pipe in the formation production zone. In fact, some wells may be first drilled vertically and then transition across a ninety-degree angle to a horizontal bore. This requires that the production string, including the filter section, have sufficient flexibility to bend around these deviations as the string is lowered into the well. Filters having metallic filter membranes may buckle or tear if the bend is too severe. Filters having ceramic or ceramic based filter membranes tend to be brittle and may crack as they deform. Dutch twill weaves also can be damaged in bending through deviated wells.

It is frequently impossible to completely prevent damage to a filter. In fact, when an underground formation collapses or shifts, it is not uncommon for a filter surrounded by the formation to undergo substantial deformation, such as elongation or crushing. Ideally, a well filter should be able to experience large deformations without losing its ability to prevent the passage of particulate matter, but conventional well filters typically suffer a severe drop in filtering ability even when subjected to even modest deformation.

In addition to their susceptibility to damage from chemical and physical abuse, membrane materials of the current types used all exhibit limitations in permeability as measured by a pressure drop across the filter during use. Filter failure, whether it is from physical or chemical damage or from the filter element's lack of permeability, requires removing the production string, installing a new filter, and lowering the string back into the well a costly and time consuming procedure.

Therefore, a need exists for a subterranean well filter that can more effectively separate particles from production fluids.

There is a further need for a subterranean filter that is resistant to physical and chemical damage and can retain its filtering capabilities if damaged.

SUMMARY OF THE INVENTION

The present invention provides a subterranean well filter for the removal of particulate matter thorough the use of a filter formed of a non-woven polymer material and strengthened with a layer of braided metal. The filter not only blocks the passage of particulate matter, it is also highly resistant to corrosion and highly flexible, giving it strength to resist damage due to physical stress or chemical exposure.

In one aspect of the invention, a subterranean filter comprises an inner member having a perforated wall permeable to fluid flow and defining a flow passage through which fluid may flow upward to the wellhead. A filter membrane material is disposed around the inner member and blocks the flow of particulate matter of a predetermined size into the flow passage of the inner member. The filter membrane comprises a single layer or multiple layers of a non-woven polymer. A metal braided layer is integrally formed around the membrane and the inner member adding strength and flexibility to the filter.

In another aspect of the invention, the inner member is made of perforated, coiled tubing having a filter membrane and a metal braided layer disposed therearound.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
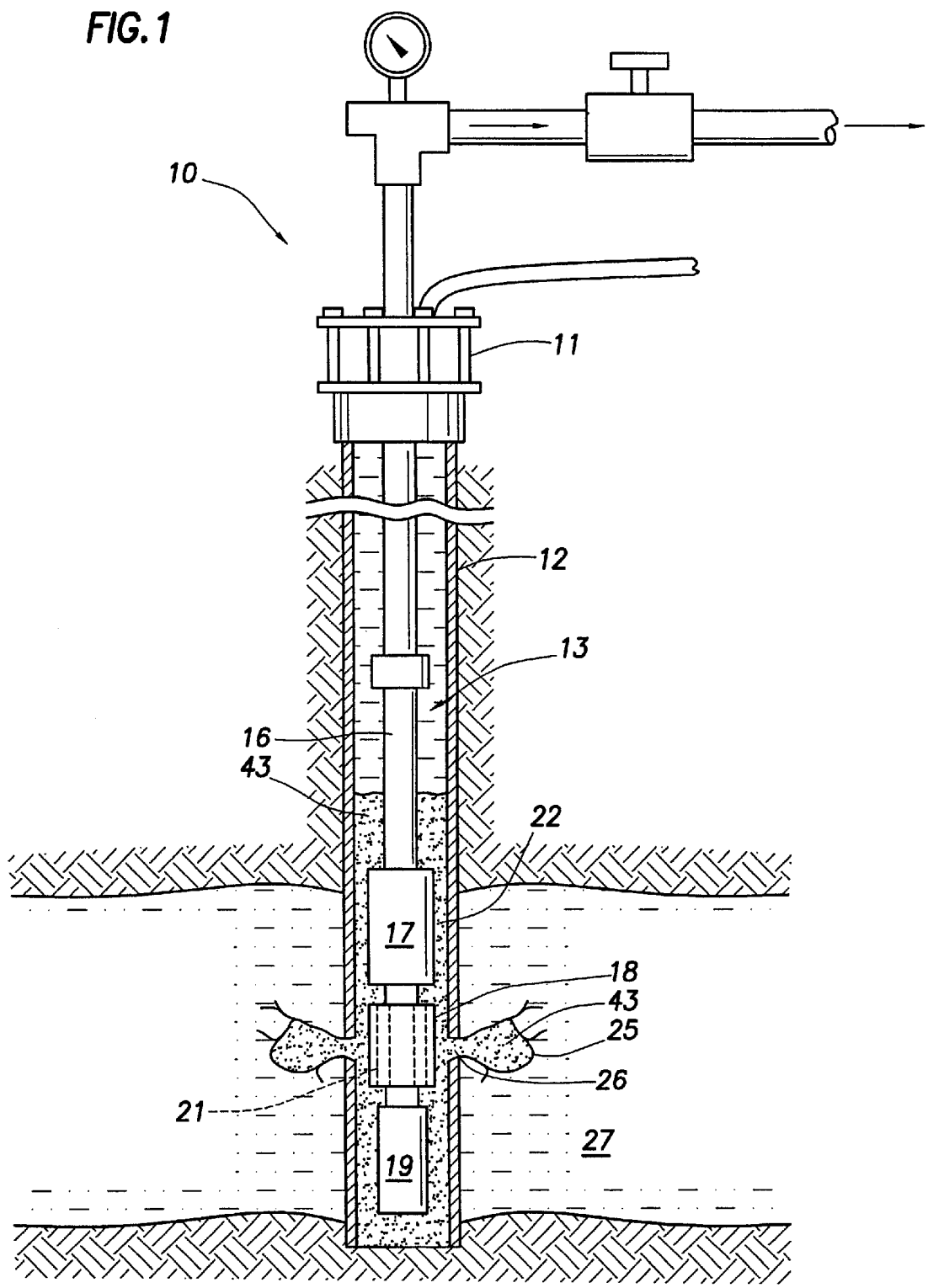
FIG. 1 is a sectional view showing the position of a subterranean filter in use with a submersible rotary pump.

FIG. 1 is a sectional view showing a filter in a cased, vertical well bore. The filter of the present invention can be used in such a well or in highly deviated wells wherein the filter (and production string) may be in an inclined or even horizontal position.

Additionally, the filter of the invention could also be used in a well having no casing.

Figure 2:
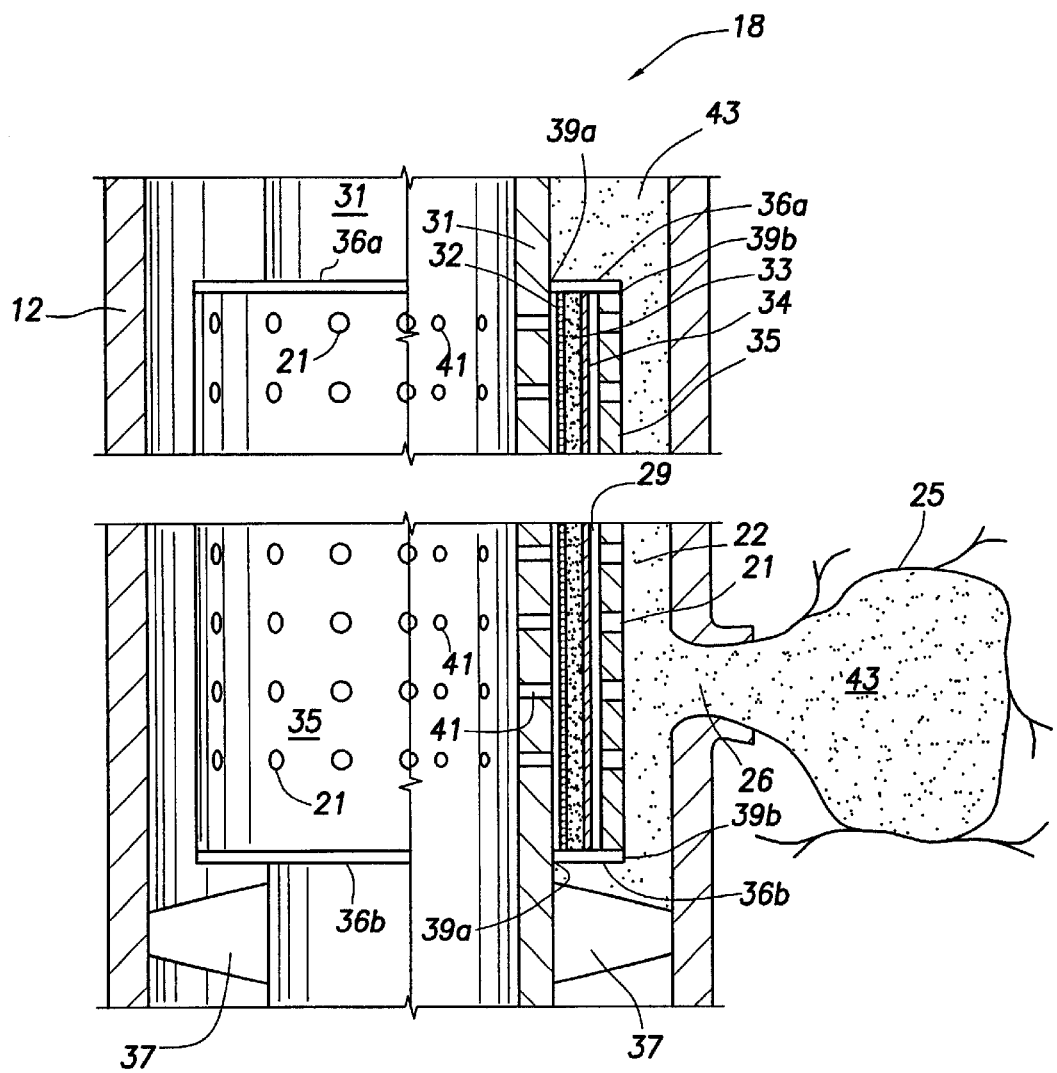
FIG. 2 is a partial longitudinal sectional view of the filter in a well setting.
Figure 3:
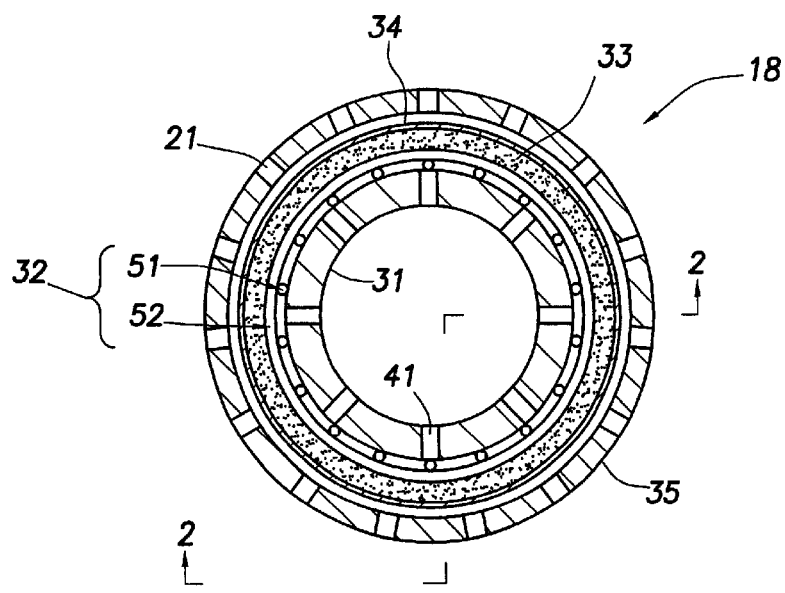
FIG. 3 is a top, sectional view of the filter.
Figure 4:
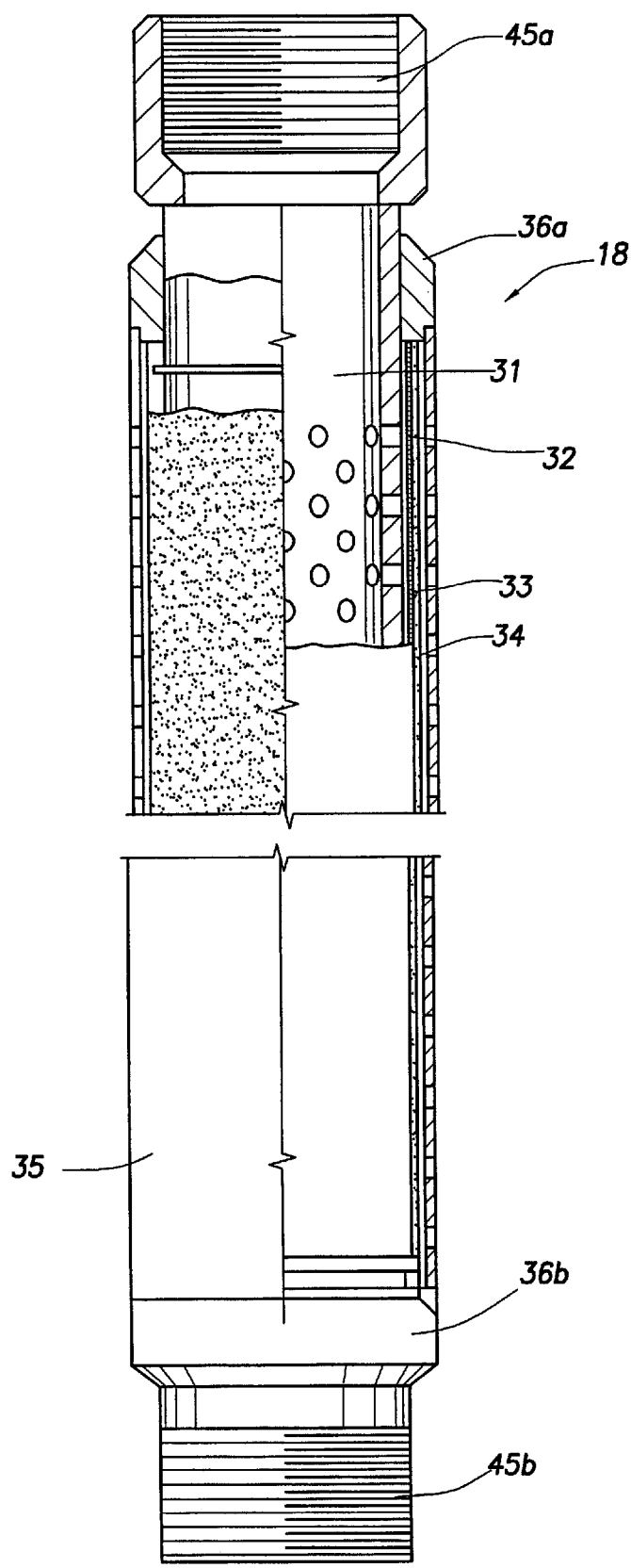
FIG. 4 is a partial sectional view of the filter.

FIGS. 2, 3 and 4 show a preferred embodiment of the invention. Filter 18 comprises a perforated inner member 31, a drainage layer 32 disposed around the inner member, a filter membrane 33 wrapped around drainage layer 32, metal braiding 34, and perforated outer member 35. Endplates 36a and 36b (visible in FIG. 4) are provided to seal the ends of the filter.

Figure 5:
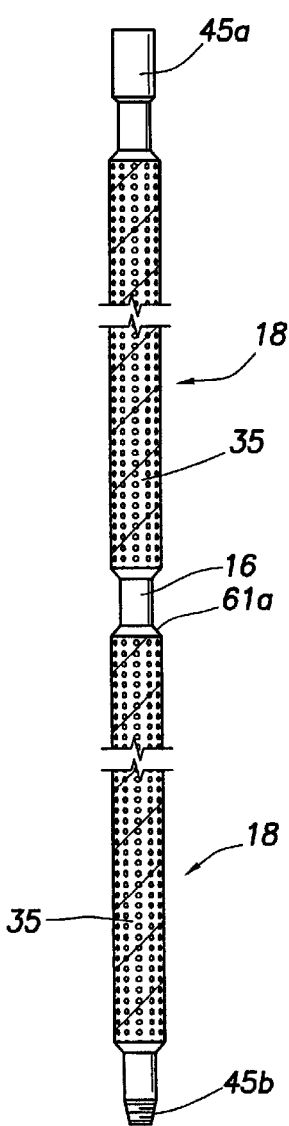
FIG. 5 is a front view showing the use of multiple filters.

Considering the features in more detail, inner member 31 may be constructed from a conventional piece of production pipe by forming a plurality of perforations 41 therein. Perforations may be in the form of holes or slits and the number of perforations in member 31 may vary considerably but typically number between 72 to 144 holes per foot. The diameter of perforations 41 in inner member 31 will preferably be in the range of ⅜ to ½ inches. In the embodiment shown in FIG. 2, centralizers 37 are attached to inner member 31 for centering filter 18 within casing 12. As best seen in FIG. 5, inner member 31 includes threaded ends 45a and 45b for threadingly connecting the filter to adjacent pieces of pipe 16. Generally, one end of filter 18 will have female threads, and the other end will have male threads.

Still referring to FIGS. 2, 3 and 4, drainage layer 32 is constructed with rods 51 placed longitudinally and having a screen 52 wrapped therearound. Rods 51 act as support members for screen 53 which is attached to the rods by any suitable method such as weaving, soldering, or braising, for example. Drainage layer 32 may be attached to base member 31 by spot welding, braising, or adhesives. The purpose of the drainage layer 32 is to conduct and promote the flow of production fluid from filter membrane 33 to the inner member 31 through perforations 41. Drainage layer 32 also assists in conducting particulates through membrane 33 which may otherwise clog the membrane over time.

Under high-pressure applications such as gravel packing, drainage layer 32 also provides protection for filter membrane 33, when high pressures in the inwardly radial direction may tend to blow portions of membrane 33 through perforations 41. In low-pressure applications it is possible to omit drainage layer 32.

Filter membrane 33 is disposed around drainage layer 32. For clarity, the thickness of membrane 33 is exaggerated in FIG. 3. The preferred material for membrane 33 is a non-woven polymer and many are commercially available. A Teflone® fabric with excellent corrosion resistance, strength, and flexibility when used to form the filter membrane of the current invention is marketed by TEX TECH Industries under part number "5233B". These fabrics preferably have a basis weight of between 20 to 23 oz. per sq. yd. The use of a non-woven material substantially improves the permeability of the filter. For example, as a pressure drop forms at a filter, a layer of particles begins to form on the surface of the filter membrane. This "filter bed", or layer of particulates, thereafter aids the filtering process. A membrane made of woven fabric material creates a filter bed with one size of particle in its surface and other sizes throughout its depth. A non-woven fabric, on the other hand, allows a uniform particle size to develop throughout the depth of the layer, not just on the surface. The result is improved permeability with less pressure drop across the filter.

Metal braided layer 34 is tightly braided to membrane 33 adding strength and rigidity to the filter 18. Metal braided layer 34, in the preferred embodiment is directly applied to membrane 33 by machine braiding around the outside of membrane 33. The result is a seamless covering of braided material over the membrane, drainage layer and inner member which causes the filter assembly to be ridged yet flexible. The density of the braid may vary, but a surface coverage of 85–90% is preferable with 48 sets of wires having a diameter of 0.012". The membrane/braiding construction makes the filter highly flexible in bending so that the membrane will not be damaged when deployed in a highly deviated well or subjected to high pressures. Membrane 33 and braiding 34 may be attached to drainage layer 32 using epoxy or silicone adhesives applied circumferentially around the ends of the filter.

Outer perforated member 35, provides a protective layer for the internal components of the filter. The outer member can be constructed from pipe or tubing material with a sufficient wall thickness to withstand the down hole radial pressures in the well. A plurality of perforations 21 are formed in the outer member. The diameter and number of perforations may be approximately the same as for inner member 31. Outer member 35 may be attached to inner member 31 using welded endplates 36a and 36b which are circumferentially welded around the inner and outer members as at 39a and 39b in FIG. 2. A small annular gap 29 may exists between outer member 35 and braid 34 for sliding the outer member over the braid. FIG. 5 illustrates the use of multiple filters for filtration in longer production zones. In these applications, two or more filters may be attached to a single base member. Alternatively, a number of individual base members/filters may be threadingly coupled together to form a longer filter.

The inner and outer members of the filters need not be rigid pipe. The inner members could be constructed of perforated, coiled tubing in instances requiring a greater filtering areas. For example, in a gravel packing process, as shown in FIG. 1, sand 43 is pumped under pressure into well annulus 22. The pressure is sufficient to force the sand into fracture 25 through perforations 26. The sand acts to keep formation sediments from infiltrating fracture 25 and clogging perforation 26, thereby maintaining an open flow path between the fracture and annulus 22. In the typical filter, a joint at each end allows threading of the filter onto the production string or manipulation with tongs. These joint areas are not perforated and therefore the surface area occupied by the joints does not function as a filter. In the gravel packing operation, these "blank filtering areas" are left exposed to casing perforations which can lead to corrosion of the joints due to high velocity particles from the formation.

In order to solve the above mentioned problems, the filter inner member is formed of perforated, coiled tubing. The coiled tubing, because it forms the inner member of the filter, can be made to any length and can be connected to production tubing above the area of the well to be perforated, forming a joint that is not exposed to damage from the gravel packing operation. The coiled tubing, which is constructed of metal strips joined at each edge to form a tube, can be formed of any length and can thereby provide an inner member for a filter of any length. Because of flexibility in manufacturing and perforating the tubing, it can be made with blank, non-perforated intervals if required to follow a particular well profile and more effectively provide filtering at a given location in the production line. Because the coiled tubing inner member provides more filtering area, the result a filter with lower draw down pressure further preventing the movement of small grains of formation sand within the formation.

The most economical way to manufacture inner filter members of coiled tubing is to perforate the flat steel strip prior to forming the tubular shape. Using this method, the edge of each piece of steel must be left intact to allow for a continuous seam when the tube is formed. After the perforated tubing is formed to a desired length, filter membrane material, braided metal layer and an outer member can be added using the same techniques described herein. The filter according to the present invention and filters having prior art membrane material consisting of sintered material and Dutch twill fabric were subjected to a liquid flow test to observe pressure drops at different flow rates. The pressure drop data can be used to evaluate the permeability of the filter medium of each filter using Darcy's equation for radial flow:

Permeability Eq. 1 Darcy=$10^{-8}$cm$^2$ $$K = \frac{Q\mu t}{A \Delta P(10\_)}$$

$K$: Permeability (Darcy)

$Q$: Flow rate (cm3/5)

$\mu$: Dynamic viscosity (CP)

$A$: Area of screen surface (cm$^2$)

$t$: Thickness of filter (cm)

$P$: Pressure drop across screen (Pa)

Using the equation above, the result of the tests, set out below demonstrate that a filter of the present invention with a non-woven polymer membrane exhibits superior permeability:

| Membrane Material | Non-Woven Polymer | Dutch Twill | Sintered Metal |
|---|---|---|---|
| Thickness (t) (cm) | .53 cm | .73 cm | .59 cm |
| $\mu$ of water @ 20% (P) | 1.005 CO | 1.005 cP | 1.005 cP |
| Area of screen (cm$^2$) | 176 cm$^2$ | 176 cm$^2$ | 176 cm$^2$ |
| $\Delta$P @ 900 cm$^3$/_ in (1_) | 13800 Pa | 20,700 Pa | 48.300 Pa |
| Calc Perm | 34 Darcy | 28 Darcy | 10 Darcy |

Additional tests have indicated that the non-woven polymer fabric used in the filter of the present invention exhibits superior corrosion resistance when exposed to acidic solutions. Test results are set forth in the following table, wherein the filter materials were exposed to a 12% HCL, 3% HF mud acid bath:

| Time Exposed | Non-Woven Polymer | Ceramic |
|---|---|---|
| 16 Hrs. | No Damage | Destroyed, unable to stay together |
| 6 days | No Damage | Destroyed, unable to stay together |

In addition to its superior permeability and resistance to chemical damage, an assembled filter of the present invention has also demonstrated a tolerance for physical abuse. For example, a filter having the non-woven membrane and the metal braided layer continued to provide its original permeability even after being deformed and crushed to 50% of its original size.

While foregoing is directed to the preferred embodiment of the present invention, other and further embodiments of the invention may be devised without departing from the basic scope thereof, and the scope thereof is determined by the claims that follow. For example, a second metal braided layer could be applied directly around the inner member in place of the drainage layer, In other cases, where particulate matter is expected to be especially large, the filter membrane could be left out of the filter leaving only the inner member, drainage layer and metal braided layer housed in the outer member.

What is claimed is:

1. A filter for use in a well, the filter comprising:
   an inner member having a plurality of perforations therethrough;
   at least one filter membrane disposed around the inner member, the filter membrane comprising a non-woven material;

a braided layer of material surrounding the at least one filter membrane and the inner member; and an outer member having a plurality of perforations and disposed around the braided layer.

2. The filter of claim 1, wherein said non-woven material is a polymer.

3. The filter of claim 2, wherein said non-woven material is selected from a group consisting of tetrafluoroethylene (TFE) fluorocarbon polymers and fluorinated ethylene-propylene (FEP) resins.

4. The filter of claim 2, wherein said non-woven material has a basis weight of between 20 and 23 ounces per square yard.

5. The filter of claim 1, further including a drainage layer disposed between the inner member and the at least one filter membrane.

6. The filter of claim 5, wherein said drainage layer includes longitudinally spaced rods and a plurality of wires circumscribing the inner member.

7. The filter of claim 1, wherein the perforated inner member is coiled tubing.

8. A filtering apparatus for use in a well, comprising:

a filter having a perforated inner member, a filter membrane disposed around said inner member, a metal braided layer disposed around the filter membrane, and an outer member disposed around the metal braided layer, the filter connected at a first and second ends to a well production pipe;

a pump disposed above said filter and connected at a first and second ends to the well production pipe and;

a motor disposed beneath the filter, the motor connected at an upper end to the well production pipe.

9. A subterranean filter for filtering sand and dirt from a production fluid, said filter comprising:

a perforated inner member;

a drainage layer disposed around said inner member;

a filter membrane disposed around said drainage layer;

a metal braiding disposed around the filter membrane and;

a permeable outer member disposed around said metal braiding.

10. The subterranean filter of claim 9, further including a drainage layer formed between the inner member and the filter membrane.

11. The subterranean filter of claim 10, wherein the drainage layer is constructed of a plurality of rods having a first diameter placed longitudinally around the inner member and a plurality of wires having a second diameter wrapped around the rods transversely.

12. A method of filtering particles form a production fluid comprising the steps of:

placing a filter having a non-woven polymer membrane disposed within a metal braided layer in a production zone of a well;

causing said production fluid to flow through said filter and;

capturing said production fluid at a well head.

13. A filter arrangement for use in a subterranean well comprising:

a filter disposed in a well and including a hollow inner support member having a peripheral wall permeable to a fluid to be filtered;

one or more layers of a non-woven polymer material disposed around the inner support member a metal braided layer formed around the one or more layers of non-woven polymer and the inner support member and;

a fluid transporting member for transporting a fluid disposed in the well in fluid communication with the filter so that fluid can flow between an interior of the inner support member and the fluid transporting member.

14. A filter arrangement for use in a subterranean well comprising:

a filter disposed in a well and including a hollow inner support member having a perforated peripheral wall;

an inner drainage layer wrapped around the inner support member and;

a plurality of layers of a non-woven polymer material wrapped around the inner drainage layer, the polymer material constructed and arranged to filter out particles over about 80 micrometers in diameter.

15. A subterranean filter for filtering particles from production fluid comprising:

a perforated, coiled tubing inner member; and a filtering member disposed around the inner member.

16. The filter of claim 15, wherein the filter member is a polymer material.

17. The filter of claim 15, wherein the filter member is a braided metal.

18. The filter of claim 15, wherein the filter member is woven around the inner member.

19. A subterranean filter for filtering particles from production fluid comprising:

a perforated, coiled tubing inner member; and a filtering member disposed around the inner member, the filter member made of a braided metal.

* * * * *